United States Patent

Wenner et al.

Patent Number: 5,467,287
Date of Patent: Nov. 14, 1995

[54] ENTHALPY CALCULATOR

[75] Inventors: Ronald J. Wenner, Brown Deer; George Rudich, Jr., Cedarburg, both of Wis.

[73] Assignee: Johnson Service Company, Milwaukee, Wis.

[21] Appl. No.: 194,039

[22] Filed: Feb. 9, 1994

[51] Int. Cl.⁶ ..................................................... F24F 11/00
[52] U.S. Cl. ........................ 364/505; 62/176.6; 236/44 C
[58] Field of Search ..................... 62/176.6; 236/44 C; 364/505

[56] References Cited

U.S. PATENT DOCUMENTS

| | | | |
|---|---|---|---|
| 2,837,286 | 6/1958 | Ross | 236/44 C |
| 3,181,791 | 5/1965 | Axelrod | 236/44 C |
| 3,284,615 | 11/1966 | Yetter | 364/148 |
| 3,469,412 | 9/1969 | Giuffre | 62/173 |
| 4,086,781 | 5/1978 | Brody et al. | 62/180 |
| 4,205,381 | 5/1980 | Games et al. | 364/505 |
| 4,353,409 | 10/1982 | Saunders et al. | 62/175 X |
| 4,362,026 | 12/1982 | Miller | 62/176.6 |
| 4,379,484 | 4/1983 | Lom et al. | 165/16 |
| 4,517,810 | 5/1985 | Foley et al. | 62/186 |
| 4,672,560 | 6/1987 | Katayama et al. | 364/556 |
| 5,369,597 | 11/1994 | Bujak, Jr. | 364/505 |

*Primary Examiner*—Edward R. Cosimano
*Attorney, Agent, or Firm*—Foley & Lardner

[57] ABSTRACT

A method and apparatus for controlling an environmental parameter is disclosed. The apparatus includes a source of energy controlled air and a source of external air. A damper determines the amount of external air and energy controlled air provided to the room. A control circuit controls the position of the damper in response to an enthalpy calculator. The enthalpy calculator includes a temperature sensitive resistor having a resistance RT and a relative humidity sensitive capacitor wherein the capacitance of the relative humidity sensitive capacitor is CS. An electronic circuit includes RT and CS and provides an output h:

$$h = \frac{VR + \frac{C2}{C1} VR1 + CS \frac{VR}{C1}}{1 + \left(\frac{CS + C2}{C1}\right)\left(\frac{FB * RO}{RO + RT}\right)}$$

The method includes the steps of providing energy controlled air and external air. The temperature and humidity of the external air are sensed, and the enthalpy is calculated using the equation $$h = VR - \frac{C2}{C1} * \left(\frac{VX * RO}{(RO + RT)} - VR1\right) - \frac{CS}{C1} * \left(\frac{VX * RO}{RO + RT} - VR\right)$$

where t is the temperature and RH is the relative humidity. The amount of external air provided is adjusted using the calculated enthalpy as a parameter.

38 Claims, 4 Drawing Sheets

ENTHALPY CALCULATOR

FIELD OF THE INVENTION

This invention relates generally to calculating the enthalpy of a body of gas or humid air for use in heating and air conditioning systems. In particular, this invention relates to the use of a circuit to model an equation that allows enthalpy to be calculated from sensed temperature and relative humidity.

BACKGROUND OF THE INVENTION

Economizer based control schemes used in commercial air conditioning equipment take advantage of what is referred to as "free" cooling. In other words, when external air may be used for cooling, it is desirable to control a damper to adjust the amount of exterior air being utilized. Some of these economizer systems use dry bulb temperature to decide if the outdoor air is suitable for use. Other systems use enthalpy as a basis for this decision. A system using the enthalpy of the air is more efficient than one relying only on temperature, because enthalpy is a measure of the energy in the air. Accordingly, it is desirable to provide a device to calculate enthalpy from temperature and humidity.

Some prior art systems which use both temperature and relative humidity to control a damper utilize a mechanical humidity sensor. The mechanical humidity sensor is connected to a temperature sensing element and a mechanical link which actuates a mechanical switch.

Another prior art enthalpy sensor utilizes an electronic humidity sensor and an electronic temperature sensor. The output of the sensors are provided to a digital circuit and a look-up table is accessed, thereby obtaining an enthalpy value for the sensed values. However, the accuracy of a look-up table is limited by its size and provides a "stepped" output rather than a continuous output, and the cost of a look-up table increases with size. Accordingly, an enthalpy calculator that has a look-up table to determine enthalpy is not useful over a wide range of temperature and humidities, because either the cost of the look-up table will be prohibitive or the enthalpy calculations will have a significant error.

Another prior art system described in U.S. Pat. No. 4,672,560, issued Jun. 9, 1987, to Katayama et al., discloses an enthalpy calculator which provides a circuit to model an enthalpy calculation. However, the enthalpy calculation modeled therein is a linear approximation of a more precise equation. Accordingly, the approximation and the circuit implementing the approximation are limited by their range of use and accuracy. For example, as described in U.S. Pat. No. 4,672,560, the range of temperatures the equation is accurate for is from 20°–30° C. Such a range is not broad enough for use in a system where the enthalpy will be used to determine whether or not to control a damper and utilize outside air.

In view of the prior art deficiencies noted above, it is desirable to provide an enthalpy calculator that provides a continuous output, rather than a stepped output such as that from a look-up table. Preferably the enthalpy calculator will model an equation to provide an enthalpy value that is accurate over a wide range of temperature and humidity. Thus, the enthalpy calculator should model a substantially exact equation rather than merely a linear approximation.

SUMMARY OF THE INVENTION

In accordance with one embodiment of this invention, an enthalpy calculator includes a temperature sensitive resistor having a resistance RT and a relative humidity sensitive capacitor wherein the capacitance of the relative humidity sensitive capacitor is CS. An electronic circuit includes RT and CS and provides an output h according to $$h = \frac{VR + \frac{C2}{C1} VR1 + CS \frac{VR}{C1}}{1 + \left(\frac{CS + C2}{C1}\right)\left(\frac{FB * RO}{RO + RT}\right)} \quad (1)$$

where FB, VR, C2, C1, VR1, and R0 are circuit parameters.

In accordance with another embodiment of this invention, an enthalpy calculator includes a temperature sensitive resistor having a resistance RT and a relative humidity sensitive capacitor wherein the capacitance of the relative humidity sensitive capacitor is CS. An electronic circuit includes RT and CS and provides an output h according to $$h = VR + \frac{C2}{C1} * VR1 - \frac{C2}{C1} * \frac{VX * RO}{RO + RT} + \frac{CS}{C1} * VR - \frac{CS}{C1} * \frac{VX * RO}{RO + RT} \quad (2)$$

where VX, VR, C2, C1, VR1, and R0 are circuit parameters.

According to a second embodiment of the present invention, an enthalpy calculator also includes a temperature sensitive resistor having a resistance RT and a relative humidity sensitive capacitor having a capacitance CS. An electronic circuit includes RT and CS and models the equation:

$$h = 0.240 * t + (1061 + 0.444 * t) * \frac{6.2198 * RH * P_{ws}(T)}{14.721 + \frac{RH * P_{ws}(T)}{100}} \quad (3)$$

According to a third embodiment of the present invention, a system for controlling an environmental parameter of a room comprises a source of energy controlled air and a source of external air. A damper is connected to the source of external air and the source of energy controlled air. The position of the damper determines the amount of external air and energy controlled air provided to the room. A control circuit controls the position of the damper and includes either of the enthalpy calculators described above to determine whether the external air is suitable to be used.

According to yet another embodiment of the present invention, a method for controlling an environmental parameter of a room includes the steps of providing energy controlled air and external air. The temperature and humidity of the controlled and external air is sensed, and an electronic circuit calculates the enthalpy from the temperature and humidity using equation 3 above. The suitability of external air is determined in response to the calculated enthalpies.

Other principal features and advantages of the invention will become apparent to those skilled in the art upon review of the following drawings, the detailed description and the appended claims.

Figure 1:
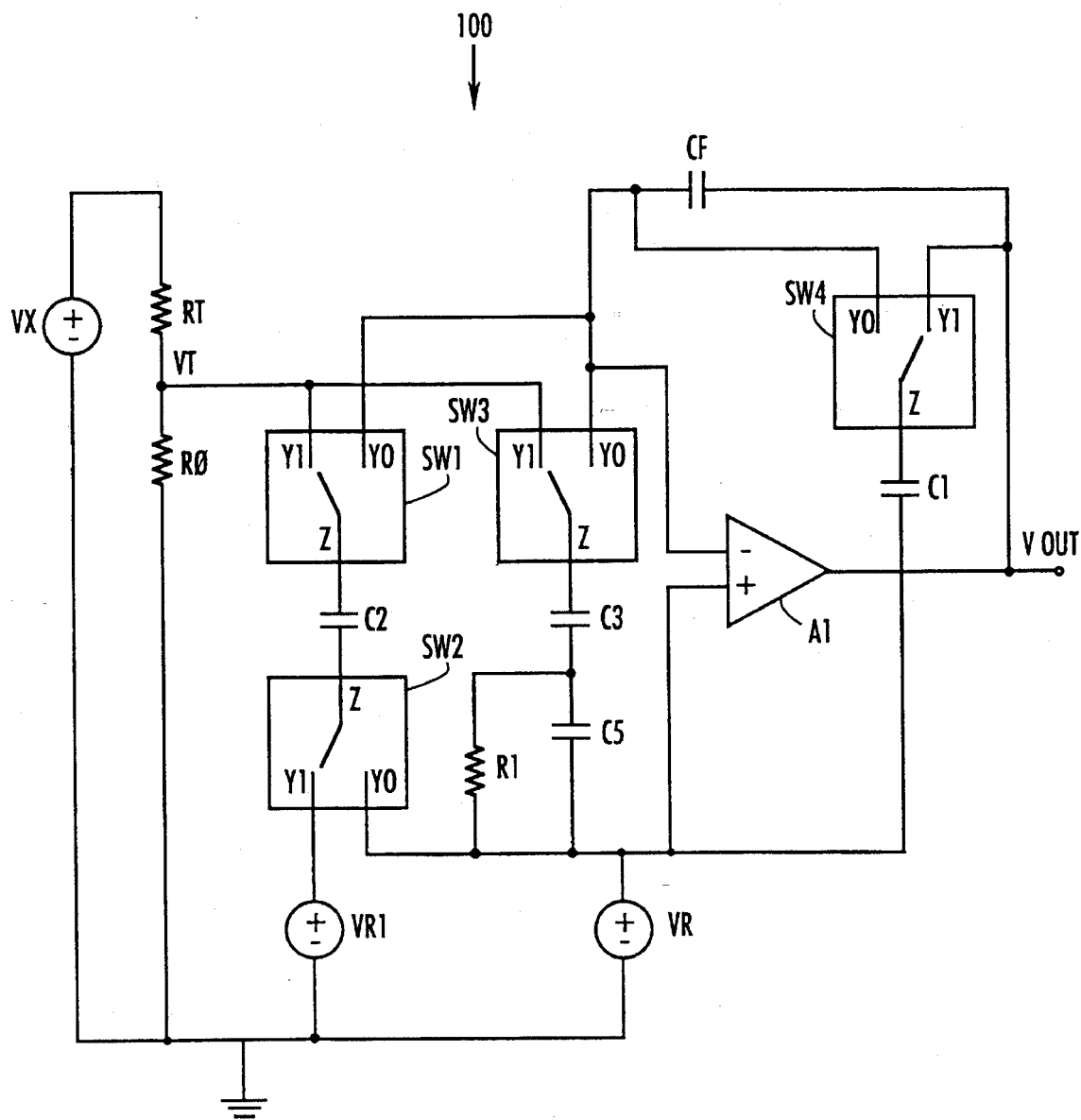
FIG. 1 is a schematic diagram of an enthalpy calculator 100 constructed in accordance with one embodiment of the present invention.

Before explaining at least one embodiment of the invention in detail, it is to be understood that the invention is not limited in its application to the details of construction and the arrangement of the components set forth in the following description or illustrated in the drawing. The invention is capable of other embodiments or being practiced or carried out in various ways. Also, it is to be understood that the phraseology and terminology employed herein is for the purpose of description and should not be regarded as limiting.

DETAILED DESCRIPTION OF THE PREFERRED EMBODIMENT

As stated above, enthalpy is a measure of the energy content of the air based on both the dry bulb temperature and the moisture content of the air. This invention includes a device that measures both the dry bulb temperature and the moisture content of the surrounding air and provides a signal that represents enthalpy.

The enthalpy value is obtained by calculating enthalpy from temperature and humidity using a widely accepted equation. The calculation is performed using an analog circuit that accurately models the equation.

The following equations may be found in the ASHRAE Fundamentals Handbook and define enthalpy (h) in terms of temperature and relative humidity.

$$h = 0.240 * t + (1061 + 0.444 * t) * \frac{6.2198 * RH * P_{ws}(T)}{14.721 + \frac{RH * P_{ws}(T)}{100}} \quad (4)$$

where the enthalpy is measured in BTUs/lb, t is the temperature in degrees Fahrenheit, RH is the percent relative humidity, and $$P_{ws} = e^{\left[\frac{a1}{T} + a2 + a3*T + a4*T^2 + a5*T^3 + a6*\ln(T)\right]} \quad (5)$$

where P is given in inches of H$_2$O and T is the temperature in degrees R. The coefficients in equation (5) have the following values:

| | |
|---|---|
| a1 = −10440.39708 | a4 = 1.289036 * 10$^{-5}$ |
| a2 = −11.2946496 | a5 = −2.478068 * 10$^{-9}$ |
| a3 = −2.7022355 * 10$^{-2}$ | a6 = 6.5459673 |

To model equation (4), the inventors have designed a circuit that has an output voltage VOUT defined as follows:

$$VOUT = K1 + K2*F1(t) + K3*F2(RH) + K4*F1(t)*F2(RH) \quad (6)$$

Where K1, K2, K3 and K4 are constants defined by circuit parameters, F1(t) is a function of temperature, and F2(RH) is a function of relative humidity. A circuit having such an output voltage will accurately model the enthalpy equation where enthalpy is calculated as a function of sensed relative humidity (RH) and sensed temperature (t).

Referring now to FIG. 1, a schematic diagram of an enthalpy calculator 100 constructed in accordance with the preferred embodiment of the present invention is shown. As will be described in greater detail below, the circuit configuration and component values are selected to provide an output voltage VOUT which has a magnitude corresponding to enthalpy for the given input humidity and temperatures. In the preferred embodiment, 0 to 5 volts at VOUT corresponds linearly to an enthalpy of 0 to 150 BTUs/lb.

Enthalpy calculator 100 includes a plurality of voltage sources VX, VR1 and VR, a temperature dependent resistor RT, a pair of resistors R0 and R1, a plurality of switches SW1, SW2, SW3 and SW4, a plurality of capacitors C1, C2, C3 and CF, a humidity dependent capacitor CS, and an OP amp A1. As will be described in greater detail below, the circuit models equations (4) and (5), thereby providing an output indicative of the enthalpy.

Temperature dependent resistor RT is a thermistor in the preferred embodiment, and may be implemented using a Fenwall Unicurve temperature sensor whose resistance R(T) in ohms is a function of temperature as:

$$R(T) = e^{\left[\frac{-b*T - \sqrt{T} * \sqrt{b^2*T + 4*c - 4*c*T*a}}{2*c*T}\right]} \quad (7)$$

where a, b and c are constants.

Capacitor CS is a temperature dependent capacitor, such as a JCI all-polymer humidity sensor having JCI Code No. HUM-1000-1, having characteristics (capacitance as a function of humidity) which may be described as a second order polynomial equation as shown below:

$$CS = c0 + c1*RH + c2*RH^2 \quad (8)$$

where the capacitance is given in picofarads and RH is the percent relative humidity. c0, c1 and c2 are constants having the following values:

c0=204.37×10$^{-12}$ c1=0.313×10$^{-12}$ c2=−0.00061011×10$^{-12}$

Each of switches SW1–SW4 is a single pole, double throw (SPDT) switch, and they share a single controlling clock. Moreover, switches SW1–SW4 are in phase such that at any given time either all four switches connect a Z terminal to a Y1 terminal (position 1) or all four switches connect the Z terminal to a Y0 terminal (position 2).

The clock frequency is fixed and is slow enough to ensure that all of the capacitors in the circuit can completely charge and discharge during each cycle. The inventors have determined that 8.5 KHz is appropriate for one embodiment, but one skilled in the art will readily recognize that other switching frequencies are equally acceptable.

First, the description of the circuit operation will be given for the time period when the switches are in position 1. Switches SW1 and SW2 connect capacitor C2 to voltage source VR1 and to voltage source VX through temperature dependent resistor (thermistor) RT. Voltage source VR1 is a source of constant DC voltage, as is voltage source VX. The voltage at a node VT (the Y1 terminal of switch SW1) is given by the voltage divider comprised of temperature dependent resistor RT and resistor R0. Thus, the steady state voltage at that node will be equal to:

$$VT = \frac{VX * R0}{R0 + RT} \quad (9)$$

The voltage across C2 is VT−VR1. Accordingly, the charge on capacitor C2 is: C2,(VT−VR1)=C2,(VX,R0/(R0+RT)−VR1). Of course, as stated above, this equation assumes that the capacitors had time to completely charge and there is no leakage through them.

Voltage VT is also provided through switch SW3 to capacitor C3 and humidity dependent capacitor CS. Thus, the voltage across capacitors C3 and CS will be VT–VR. Capacitor C3 is selected to have a much greater capacitance than capacitor CS and blocks DC signals, but couples AC signals between couples capacitor CS and Z terminal of SW3. The voltage on capacitor C3 will reach a steady state DC value equal to (VT–VR)/2, therefore the voltage on capacitor CS will also be equal to (VT–VR)/2. At this point, the charge on CS will be equal to CS*(VT–VR)/2.

Capcitor CF is connected between the circuit output (VOUT) and the inverting input of OP amp A1. The voltage on capacitor CF will be (VR–VOUT) because voltage source VR is connected to the non-inverting input of OP amp A1. The charge on CF will be CF,(VR–VOUT), Capacitor C1 is connected to output voltage VOUT through switch SW4 and is connected at its other terminal to voltage source VR. Accordingly, the voltage across capacitor C1 will be VOUT–VR, and the amount of charge on capacitor C1 is C1*(VOUT–VR).

When the switches SW1–SW4 change to position 2 (connecting terminals Z and Y0), capacitors Cl and C2 are connected in parallel to each other and are also connected in parallel with the series connection of C3 and CS. Since the output of op amp A1 will change such that its negative and positive inputs are equal and are at VR, the voltage across capacitors C1, C2 and C3+CS will be forced to be zero. Since C3 is very large and its voltage does not change, the voltage on CS will change from (VT–VR)/2 to –(VT–VR)/2. Therefore, the change in voltage on CS will be (VT–VR) and the charge transfer will be CS*(VT–VR). The total charge on C2, CS and C1 will be $$QT = *(VT-VR1) + CS*(VT-VR) + C1*(VOUT-VR) \quad (10)$$

and this net charge will be transferred to capacitor CF which is in the feedback loop of OP amp A1.

When charge QT is transferred to capacitor CF, the voltage across capacitor CF, V(CF), changes. This voltage is given by V(CF)=VR–VOUT+Δ VOUT, where Δ VOUT is the amount that the voltage across capacitor CF must change when charge QT is transferred to it. That is, Δ VOUT=QT/CF.

When Δ VOUT is equal to 0, then the circuit has reached a steady state condition. At such time, the total charge QT must also be 0 and thus 0=Q2+QS+Q1. Substituting for the charges, 0=C2*(VT–VR1)+CS*(VT–VR)+C1*(VOUT–VR).

$$VOUT = VR + \quad (11)$$

$$\frac{C2}{C1} * VR1 - \frac{C2}{C1} * VT + \frac{CS}{C1} * VR - \frac{CS}{C1} * VT$$

As may be seen, the equation above for VOUT, which describes the output of the circuit of FIG. 1, has the form of equation 6 above, where VR, VR1, C2 and C1 determine constants K1–K4 and VT corresponds to F1(t) and CS corresponds to F2(RH). Thus, the circuit of FIG. 1 may be used to accurately model the enthalpy equation.

As will be described in detail later, the component values should be chosen by minimizing the error between the circuit output VOUT and a scaled value of enthalpy for the range of humidity and temperature values desired. For the circuit of FIG. 1, the following circuit parameters were selected:

| | |
|---|---|
| VR = 1.54 | VT = (VX*R0)/(R0 + RT) |
| VR1 = –3.023 | VX = –0.493 |
| C2 = 150 PFD | R0 = 2100 |
| C1 = 56 PFD | | where RT is the thermistor described above.

Figure 2:
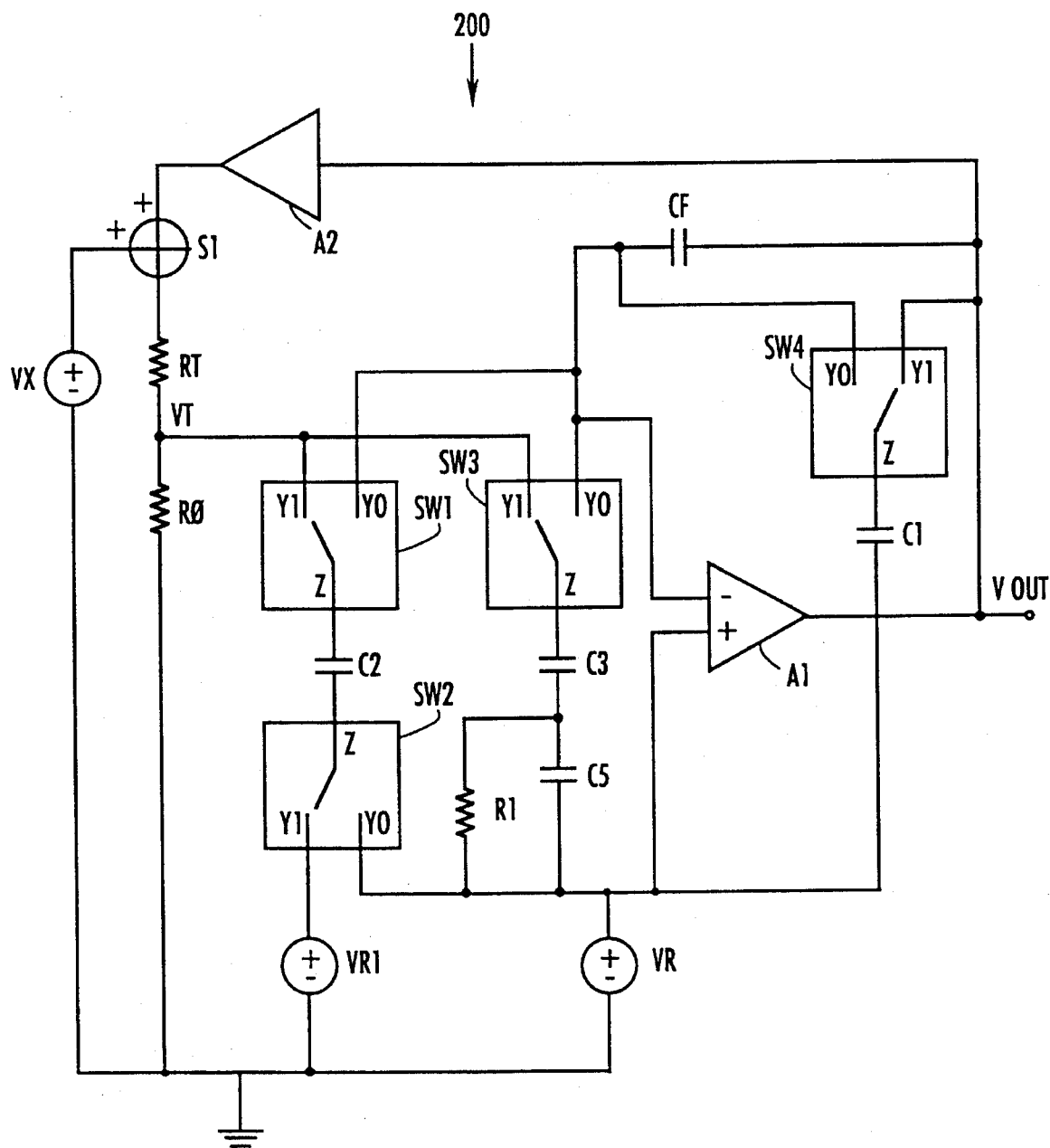
FIG. 2 is a schematic diagram of an alternative enthalpy calculator 200.

Referring now to FIG. 2, a schematic diagram of an alternative enthalpy calculator 200 constructed in accordance with the invention is shown. Enthalpy calculator 200 includes all of the components of the embodiment of FIG. 1, but further includes a feedback amplifier A2 having a gain of FB, and a summer S1.

Amplifier A2 receives as an input VOUT and multiplies that value by FB. The product is provided to summer S1, where it is summed with VX and provided to temperature dependent resistor RT.

Thus, the voltage at node VT will be equal to the sum of voltages VX+FB*VOUT divided by the voltage divider. In other words, $$VT = \frac{R0 * (VX + FB * VOUT)}{R0 + RT} \quad (12)$$

The remaining portions of the circuit operate identically as in FIG. 1. Therefore, the output equation will be the same, except that VX in the definition of VT above is replaced by (VX+FB*VOUT). Making this substitution and solving for VOUT results in:

$$VOUT = \quad (13)$$

$$\frac{VR + \frac{C2}{C1} VR1 + CS \frac{VR}{C1} - \frac{CS+C2}{C1} * \frac{VX * RO}{RO+RT}}{1 + \left(\frac{CS+C2}{C1}\right)\left(\frac{FB * RO}{RO+RT}\right)}$$

Equation 13 may be re-written in a more general form as:

$$VOUT = \quad (14)$$

$$\frac{K1 + K2 * F1(t) + K3 * F2(RH) + K4 * F1(t) * F2(RH)}{1 + K5 * F1(t) + K6 * F1(t) * F2(RH)}$$

Figure 3:
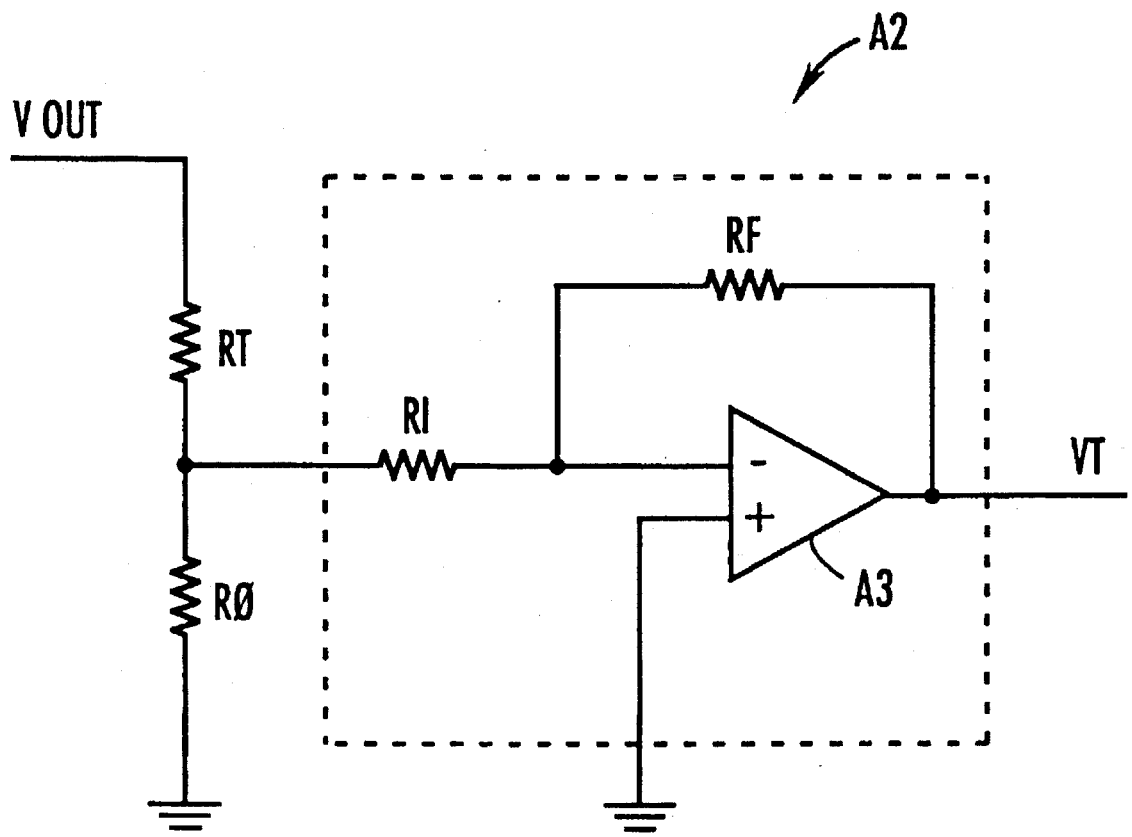
FIG. 3 is a schematic diagram of the amplifier of the enthalpy calculator of FIG. 2.
Figure 4:
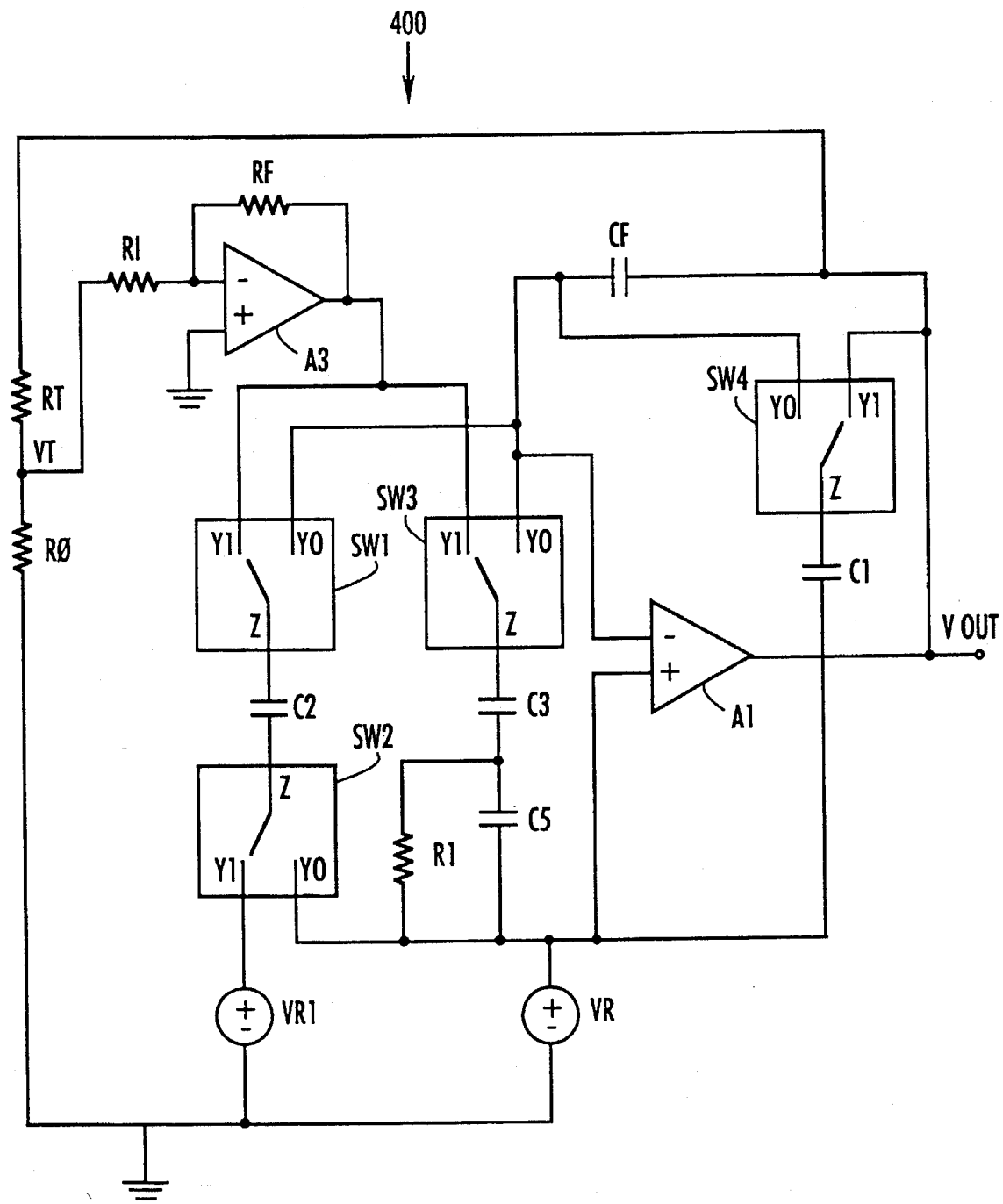
FIG. 4 is a schematic diagram of the preferred embodiment of the enthalpy calculator constructed in accordance with the present invention.

Referring now to FIG. 3, a circuit used to implement the embodiment of FIG. 4 is shown. Letting VX equal 0 and amplifier A2 having unity gain results in the circuit on the left-hand ride of FIG. 3, and the right-hand side of FIG. 3 includes an operational amplifier A3, an input resistor RI and a feedback resistor RF. The input resistor RI is connected to the voltage divider formed by resistors RT and R0, which are connected between VOUT and ground. Analysis of this circuit yields the gain FB of amplifier A2 as.

As shown in FIG. 4, the circuit of FIG. 3 has been combined with the circuit of FIG. 2 and FIG. 1 to produce an enthalpy calculator including an amplifier A3. FIG. 4 differs from FIG. 2 in that voltage source VX has been eliminated, and amplifier A2 has unity gain (and so it is not shown in FIG. 4) and resistor RT is connected to output VOUT through amplifier A3. Input resistor RI is connected between node VT and the inverting input of OP amp A3. Feedback resistor RF is connected across the output and inverting input of OP amp A3, and the non-inverting input of OP amp A3 is connected to ground. Accordingly, OP amp A3 provides a gain of, and multiplies VT by, –RF/RI. The output of OP amp A3, –(VT*RF/RI) is provided to the Y1 terminals of switches SW1 and SW3. With VX=0, equation 13 above becomes:

$$VOUT = \frac{VR + \frac{C2}{C1} VR1 + CS \frac{VR}{C1}}{1 + \left( \frac{CS + C2}{C1} \right) \left( \frac{FB * RO}{RO + RT} \right)} \quad (15)$$

To determine circuit components that result in accurate enthalpy calculations, known values of enthalpy for a range of temperatures and humidities were used to produce a matrix from which the variables (circuit component values) may be calculated. This was done as will be described below.

First, the range of temperatures of interest was selected to be 55° F. to 105° F., and the range of relative humidities of interest was selected to be from 0 to 100%. The step in temperature was chosen to be 15° and the step in relative humidity was chosen to be 10%.

Given equation 8 above for the capacitance as a function of relative humidity for the humidity sensor CS, and equation 7 for the resistance as a function of temperature for temperature sensor RT, the circuit values that minimize the error for an enthalpy output may be calculated.

However, equation 7 above, which gives the resistance of the thermistor RT as a function of temperature, was based on a temperature T in degrees Kelvin. The following equation 16 is analogous to equation 8, but is based on a temperature t in degrees F $$R(T) = e^{\left[ \frac{-b \cdot \left( \frac{T-32}{1.8} + 273 \right) - \sqrt{\left( \frac{T-32}{1.8} + 273 \right)} \sqrt{b^2 \cdot \left( \frac{T-32}{1.8} + 273 \right) + 4 \cdot c - 4 \cdot c \cdot \left( \frac{T-32}{1.8} + 273 \right)} \cdot a}{2 \cdot c \cdot \left( \frac{T-32}{1.8} + 273 \right)} \right]} \quad (16)$$

Where
a=0.0015168834
b=2.1955575994×10⁻⁴
c=2.4154651819×10⁻⁶

To solve the variables, an input matrix B is used where b0=VR1, b1=VR and b2=VX. The circuit unknowns and the input vector must be given initial values. The following input and initial values were selected

| b0 = −3.023 | C1 = 56 × 10⁻¹² |
| b1 = 1.54 | C2 = 150 × 10⁻¹² |
| b2 = −0.493 | R0 = 2100 |

Limitations were placed on the voltage sources to provide a circuit consistent with available input power, etc. Thus, −2.5<VR and VR1<10, and R0>0. Equation 8 above was used in a matrix having an entry for each of the following values:

| % RH | °1 F. | h/30 |
|---|---|---|
| 0 | 75 | 18/30 |
| 20 | 75 | 22/30 |
| 40 | 75 | 26.048/30 |
| 20 | 85 | 25.983/30 |

-continued

| % RH | °1 F. | h/30 |
|---|---|---|
| 40 | 85 | 31.658/30 |
| 60 | 85 | 37.428/30 |
| 60 | 75 | 30.144/30 |
| 80 | 75 | 32.288/30 |
| 20 | 65 | 18.427/30 |
| 40 | 65 | 21.279/30 |
| 60 | 65 | 24.154/30 |
| 80 | 65 | 27.053/30 |
| 60 | 95 | 46.413/30 |
| 80 | 95 | 54.649/30 |
| 20 | 95 | 30.494/30 |
| 40 | 95 | 38.363/30 |
| 20 | 105 | 35.681/30 |
| 40 | 105 | 46.486/30 |
| 20 | 55 | 15.169/30 |
| 40 | 55 | 17.15/30 |
| 60 | 55 | 19.143/30 |
| 60 | 105 | 57.629/30 |

An output vector is defined by minimizing the error of VR1, VR, FB, and R0 in the matrix of equations. The output matrix is A=−0,177, 0.127, −1.52, 1,206*10⁴. Thus, the circuit component values are VR1=−0,177, VR=0.127, FB=−1.52, and R0=1,206*10⁴.

To determine the accuracy of the model, calculated enthalpy values are compared to actual enthalpy values. This was done for a temperature range of 55° F. to 105° F., in 15° steps, and for relative humidity values from 0% to 100%, in 10% steps, and the error was generally less than 0.5 BTU/lb over the range of interest, which corresponds to a calculated enthalpy that is within 4% of the actual enthalpy. Accordingly, it may be seen that the circuit above accurately calculates enthalpy.

Of course, the precise component values above must be implemented with commercially available resistors. For the amplifier resistors, commercially available resistors RF=16.2K and RI=107K were selected.

Using these values in a mathcad program and solving for a 1% value of R0 gives the following results:

| C1 = 56 PFD | FB = −.1514 |
| C2 = 150 PFD | VR1 = −.126 volts |
| R0 = 14,300 Ω | VR = +0.96 volts |

Accordingly, the circuit in the embodiment of FIG. 4 is implemented using these results. As one skilled in the art will readily know, other embodiments may use completely different values, or have values substantially as those given, but not exact (±10% e.g.).

A similar routine was performed for the circuit of FIG. 1 to determine the component values given above in the description of FIG. 1.

In one embodiment of the invention, enthalpy calculator 400 or 200 is part of a heating or cooling (i.e. environmental parameter control) system, and after the enthalpy based on the sensed temperature and sensed humidity is calculated, the value is transmitted to a control circuit (not shown). The transmission may be over a wire or using an RF transmitter or similar device. In this way, the enthalpy value may be provided to a remote location to be used with other data in order to control a damper.

The position of the outside air damper controls how much outside air (external air) is delivered to the room or building being heated or cooled. The return air damper likewise controls the amount of heated or cooled air (energy controlled air) being recirculated in the room or building.

The controller which receives the calculated enthalpy value will adjust a damper to either utilize more or less "free air" depending upon the desired cooling, temperature of the room to be cooled, and the enthalpy of the "free air" relative to the controlled air, as is known to do so in the prior art. Accordingly, in one aspect of the invention, an air conditioning and/or heating system utilizes the enthalpy calculator disclosed herein to more economically cool and/or heat a room or building.

Thus, it should be apparent that there has been provided in accordance with the present invention an enthalpy calculator that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. An enthalpy computing system for use in controlling an environmental condition of a room, comprising:

a temperature sensor having an output RT indicative of temperature;

a humidity sensor having an output CS indicative of humidity;

an electronic circuit having the output RT as a first input and the output CS as a second input, wherein the electronic circuit provides an output h of the form:

h=K1+K2*F1(RT)+K3*F2(CS)+K4*F1(RT)*F2(CS);

a source of energy controlled air;

a source of external air;

a damper, connected to the source external air and further connected to the source of energy controlled air, wherein a position of the damper determines how much of the external air and the energy controlled air is provided to the room, and wherein the position of the damper is based on the output h.

2. The enthalpy computing system of claim 1, wherein h is a calculated enthalpy having an error from actual enthalpy of no more than 4% over a range of temperatures from 55 degrees to 105 degrees and a range of humidities from 0% to 100%.

3. The enthalpy computing system of claim 1, wherein said electronic circuit further comprises:

voltage means for applying a voltage potential to said output RT of said temperature sensor;

charging and discharging means for charging up to a voltage supplied thereto and for discharging said voltage at an output port when said voltage is not supplied to said charging and discharging means;

switching means for connecting and disconnecting said voltage means to said charging and discharging means according to a predetermined rate, wherein said predetermined rate allows for said charging and discharging means to fully charge up to said voltage supplied thereto before said voltage is switched away from said charging and discharging means by said switching means; and amplification means for amplifying said voltage received from said output port of said charging and discharging means by a predetermined amount, and outputting said output h as a result thereof, wherein said output CS of said humidity sensor is connected to said charging and discharging means and charges and discharges at times equal to when said charging and discharging means charges and discharges, and wherein said output RT of said temperature sensor is connected to said voltage means.

4. The enthalpy computing system of claim 1, wherein the temperature sensor is a temperature sensitive resistor, and wherein RT is the resistance of the temperature sensitive resistor.

5. The enthalpy computing system of claim 4, wherein RT is given by:

$$R(T) = e^{\left[\frac{-b*T - \sqrt{T*}\sqrt{B^2*T + 4*c - 4*c*T*a}}{2*c*T}\right]}$$

where a, b and c are constants and T is the temperature in degrees R.

6. The enthalpy computing system of claim 5, wherein the humidity sensor is a relative humidity sensitive capacitor, and wherein the capacitance of the relative humidity sensitive capacitor is CS.

7. The enthalpy computing system of claim 6, wherein CS is given by CS=c0+c1*RH+c2*RH$^2$, where c0, c1 and c2 are constants and RH is the percent relative humidity.

8. The enthalpy computing system of claim 7, wherein:

the electronic circuit comprises a first voltage source having a voltage of VR, and a second voltage source having a voltage of VR1, a third voltage source having a voltage of VX, a first capacitance having a capacitance of C1, a second capacitance having a capacitance of C2, and a resistor having a resistance of R0; and the output h is further of the form:

$$h = VR + \frac{C2}{C1} *VR1 - \frac{C2}{C1} * \frac{VX*RO}{RO + RT} + \frac{CS}{C1} *VR - \frac{CS}{C1} * \frac{VX*RO}{RO + RT}.$$

9. The enthalpy computing system of claim 8, wherein said electronic circuit further comprises a first switch, a second switch, a third switch, a fourth switch, a third capacitance having a capacitance of C3, and a fourth capacitance having a capacitance of CF, and an op amp A1, and wherein said third voltage source VX is connected at one end to a group potential and is connected at another end to said output RT of said temperature sensor;

said resistor R0 is connected at one end to said ground potential and is connected at another end to said output RT of said temperature sensor, said resistor R0 being in a series relationship with respect to said temperature sensor;

said second voltage source VR1 is connected at one end to said ground potential and is connected at another end to said second switch;

said first voltage source V1 is connected at one end to said ground potential and is connected at another end to said op amp A1, said first switch and said output CS of said humidity sensor;

said first switch having an input side connected to said second capacitance C2 and having an output side that can be set to one of a first and a second position, said first switch is connected to said output RT of said temperature sensor and to said resistor R0 when in said first position and is connected to said fourth capacitance CF when in said second position, said second switch having an input side connected to said second capacitance C2 and having an output side that can be set to one of a first and second position, said second switch is connected to said another end of said second voltage source VR1 when in said first position and is connected to said output CS of said humidity sensor and said first voltage source VR when in said second position;

said third capacitance C3 having a first end connected to said output CS of said humidity sensor and having a second end connected to said third switch;

said third switch having an input side connected to said third capacitance C3 and having an output side that can be set to one of a first and a second position, said third switch is connected to said output RT of said temperature sensor when in said first position and is connected to said fourth capacitance CF and to said op amp A1 when in said second position;

said op amp A1 having an inverting input connected to said third switch and to said fourth capacitance CF and having a non-inverting input connected to said another end of said first voltage source VR, said first switch and said output CS of said humidity sensor, said op amp A1 having an output from which the output h is obtained;

said fourth capacitance CF having a first end connected to said inverting input of said op amp A1 and to said fourth switch and having a second end connected to said output of said op amp A1;

said fourth switch having an input side connected to said first capacitance C1 and having an output side that can be set to one of a first and a second position, said fourth switch is connected to said output of said op amp A1 when in said first position and is connected to said first end of said fourth capacitance CF and said inverting input of said op amp A1 when in said second position;

said first capacitance C1 having a first end connected to said input of said fourth switch and having a second end connected to said another end of said first voltage source VR and said non-inverting input of said op amp A1; and a clock circuit connected to said first switch, said second switch, said third switch, and said fourth switch, wherein said clock circuit changes said switches from said first position to said second position and from said second position to said first position all at a same time and at a predetermined rate, and wherein said first, second, third and fourth capacitances C1, C2, C3 and CF, and said output CS of said humidity sensor are charged when said first, second, third and fourth switches are in said first position, and said first, second, third and fourth capacitances C1, C2, C3 and CF, and said output CS of said humidity sensor are discharged when said first, second, third and fourth switches are in said second position.

10. The enthalpy computing system of claim 9, further comprising a second resistor having a resistance of R1 and being connected in a parallel relationship with respect to said output CS of said humidity sensor.

11. The enthalpy computing system of claim 9, wherein said predetermined rate of the clock circuit allows each of said first, second, third and fourth capacitances C1, C2, C3 and CF, and said output CS of said humidity sensor to be completely charged and discharged during any one cycle, and wherein a time length of said any one cycle is determined as an inverse of the predetermined rate.

12. The enthalpy computing system of claim 11, wherein said second capacitance C2 is charged when said output side of said first switch and said second switch are in said first position and is discharged when said output side of said first switch and said second switch are in said second position, said third capacitance C3 and said output CS of said humidity sensor are charged when said output side of said third switch is in said first position and are discharged when said output side of said third switch is in said second position, and said fourth capacitance CF is charged when output of said fourth switch is in said first position and is discharged when said output of said fourth switch is in said second position.

13. An enthalpy computing system for use in controlling an environmental condition of a room, comprising:

a temperature sensor having an output RT indicative of temperature;

a humidity sensor having an output CS indicative of humidity;

an electronic circuit having the output RT as a first input and the output CS a second input, wherein the circuit provides an output h of the form:

$$h = \frac{K1 + K2*F1(RT) + K3*F2(CS) + K4*F1(RT)*F2(CS)}{1 + K5*F1(RT) + K6*F1(RT)*F2(CS)} ;$$

a source of energy controlled air;

a source of external air;

a damper, connected to the source of external air and further connected to the source of energy controlled air, wherein a position of the damper determines how much of the external air and the energy controlled air is provided to the room, and wherein the position of the damper is based on the output h.

14. The enthalpy computing system of claim 13, wherein the temperature sensor is a temperature sensitive resistor, wherein RT is the resistance of the temperature sensitive resistor.

15. The enthalpy computing system 14, wherein RT is given by:

$$R(T) = e^{\left[\frac{-b*T - \sqrt{T* \sqrt{B^2*T+4*c-4*c*T*a}}}{2*c*T}\right]}$$

where a, b and c are constants and T is the temperature.

16. The enthalpy computing system of claim 15, wherein the humidity sensor is a relative humidity sensitive capacitor, and wherein the capacitance of the relative humidity sensitive capacitor is CS.

17. The enthalpy computing system of claim 16, wherein CS is given by $CS = C0 + c1*RH + c2*RH^2$, where c0, c1 and c2 are constants and RH is the percent relative humidity.

18. The enthalpy computing system of claim 17, wherein the electronic circuit comprises a first voltage source having a voltage of VR, a second voltage source having a voltage of VR1, a feedback amplifier having a gain of FB, a first capacitance having a capacitance of C1, a second capacitance having a capacitance of C2, and a resistor having a resistance of R0; and wherein the output h is further of the form:

$$h = \frac{VR + \frac{C2}{C1} VR1 + CS \frac{VR}{C1}}{1 + \left(\frac{CS + C2}{C1}\right)\left(\frac{FB * RO}{RO + RT}\right)}.$$

19. The enthalpy computing system of claim 18, wherein VR is substantially 0.96 volts, VR1 is substantially −0.126 volts, C1 is substantially 56 picofarads, C2 is substantially 150 picofarads, FB is substantially −0.1514, and R0 is substantially 14,300 ohms.

20. An enthalpy computing system for use in controlling an environmental condition of a room, comprising:

a temperature sensor having an output RT indicative of temperature;

a humidity sensor having an output CS indicative of temperature;

an electronic circuit having the output RT as a first input and the output CS a second input, wherein the circuit provides an output h and models the equation:

$$h = 0.240 * t + (1061 + 0.444 * t) * \frac{6.2198 * RH * P_{ws}(t)}{14.721 + \frac{RH * P_{ws}(t)}{100}}$$

where:

$$P_{ws} = e^{\left[\frac{a1}{T} + a2 + a3*T + a4*T^2 + a5*T^3 + a6*ln(t)\right]};$$

and T is temperature and a1–a6 are constants;

a source of energy controlled air;

a source of external air;

a damper, connected to the source of external air and further connected to the source of energy controlled air, wherein a position of the damper determines how much of the external air and the energy controlled air is provided to the room, and wherein the position of the damper is based on the output h.

21. The enthalpy computing system of claim 20, wherein the temperature sensor is a temperature sensitive resistor, and wherein RT is the resistance of the temperature sensitive resistor and RT is given by:

$$R(T) = e^{\left[\frac{-b*T - \sqrt{T* \sqrt{B^2*T+4*c-4*c*T*a}}}{2*c*T}\right]}$$

where a, b and c are constants and T is the temperature in degrees R.

22. The enthalpy computing system of claim 21, wherein h is a calculated enthalpy having an error from actual enthalpy of no more than 4% over a range of temperatures from 55 degrees to 105 degrees F. and a range of humidities from 0% to 100%.

23. The enthalpy computing system of claim 21, wherein the humidity sensor is a relative humidity sensitive capacitor, and wherein the capacitance of the relative humidity sensitive capacitor is CS, and CS is given by $Cs = c0 + c1*RH + c2*RH^2$, where c0, c1 and c2 are constants and RH is the percent relative humidity.

24. The enthalpy calculator of claim 23 wherein:

the electronic circuit comprises a first voltage source having a voltage of VR and a second voltage source having a voltage of VR1, a third voltage source having a voltage of VX, a first capacitance having a capacitance of C1, a second capacitance having a capacitance of C2, and resistor having a resistance of R0; and the output h is further of the form:

$$h = VR + \frac{C2}{C1} * VR1 - \frac{C2}{C1} * \frac{VX*RO}{RO + RT} + \frac{CS}{C1} * VR - \frac{CS}{C1} * \frac{VX*RO}{RO + RT}.$$

25. The enthalpy computing system of claim 23, wherein the electronic circuit comprises a first voltage source having a voltage of VR, a second voltage source having a voltage of VR1, a feedback amplifier having a gain of FB, a first capacitance having a capacitance of C1, a second capacitance having a capacitance of C2, and a resistor having a resistance of R0; and wherein the output h is further of the form:

$$h = \frac{VR + \frac{C2}{C1} VR1 + CS \frac{VR}{C1}}{1 + \left(\frac{CS + C2}{C1}\right)\left(\frac{FB * RO}{RO + RT}\right)}.$$

26. The enthalpy computing system of claim 25, wherein VR is substantially 0.96 volts, VR1 is substantially −0.126 volts, C1 is substantially 56 picofarads, C2 is substantially 150 picofarads, FB is substantially −0.1514, and R0 is substantially 14,300 ohms.

27. A system for controlling an environmental parameter of a room, comprising:

a source of energy controlled air;

a source of external air;

a damper, connected to the source of external air and further connected to the source of energy controlled air, wherein a position of the damper determines whether the external air is provided to the room;

a control circuit comprising:

a temperature sensor having an output RT indicative of temperature;

a humidity sensor having an output CS indicative of humidity;

an electronic circuit having RT as a first input and the CS a second input, wherein the circuit provides an output h and models the equation:

$$h = 0.240 * t + (1061 + 0.444 * t) * \frac{6.2198 * RH * P_{ws}(t)}{14.721 + \frac{RH * P_{ws}(t)}{100}}$$

where:

$$P_{ws} = e^{\left[\frac{a1}{T} + a2 + a3*T + a4*T^2 + a5*T^3 + a6*ln(T)\right]}$$

and T is temperature and a1–a6 are constants, and wherein the control circuit is connected to the damper and controls the position of the damper with the output h of the circuit being a parameter used to determine the position of a damper.

28. The system of claim 27, wherein h is a calculated enthalpy having an error from actual enthalpy of no more than 4% over a range of temperature from 55 degrees to 105 degrees and a range of humidities from 0% to 100%.

29. The system of claim 27, wherein the temperature sensor is a temperature sensitive resistor, and wherein RT is the resistance of the temperature sensitive resistor and RT is given by:

$$R(T) = e^{\left[\frac{-b*T-\sqrt{T*}\sqrt{B^2*T+4*c-4*c*T*a}}{2*c*T}\right]}$$

where a, b and c are constants and T is the temperature.

30. The system of claim 29, wherein the humidity sensor is a relative humidity sensitive capacitor wherein the capacitance of the relative humidity sensitive capacitor is CS and CS is given by $CS=c0+c1*RH+c2*RH^2$, where c0 c1 and c2 are constants and RH is the percent relative humidity.

31. The system of claim 30, wherein:

the electronic circuit comprises a first voltage source having a voltage of VR, and a second voltage source having a voltage of VR1, a third voltage source having a voltage of VX, a first capacitance having a capacitance of C1, a second capacitance having a capacitance of C2, and a resistor having a resistance of R0; and the output h is further of the form:

$$h = VR + \frac{C2}{C1}*VR1 - \frac{C2}{C1}*\frac{VX*RO}{RO+RT} + \frac{CS}{C1}*VR - \frac{CS}{C1}*\frac{VX*RO}{RO+RT}.$$

32. The system of claim 31, wherein VX is substantially −0.493 volts, VR is substantially 1.54 volts, VR1 is substantially −3.023 volts, C1 is substantially 56 picofarads, C2 is substantially 150 picofarads, and R0 is substantially 2100 ohms.

33. The system of claim 30, wherein the electronic circuit comprises a first voltage source having a voltage of VR, a second voltage source having a voltage of VR1, a feedback amplifier having a gain of FB, a first capacitance having a capacitance of C1, a second capacitance having a capacitance of C2, a third capacitance having a capacitance of CF, and a resistor having a resistance of R0; and wherein the output h is further of the form:

$$h = \frac{VR + \frac{C2}{C1}VR1 + CS\frac{VR}{C1}}{1+\left(\frac{CS+C2}{C1}\right)\left(\frac{FB*RO}{RO+RT}\right)}.$$

34. The system of claim 33, wherein VR is substantially 0.96 volts, VR1 is substantially −0.126 volts, C1 is substantially 56 picofarads, C2 is substantially 150 picofarads, FB is substantially −0.1514, and R0 is substantially 14,300 ohms.

35. A method for controlling an environmental parameter of a room, comprising:

providing energy controlled air;

providing external air;

sensing the temperature of the external air;

sensing the humidity of the external air;

using an electronic circuit to calculate enthalpy based on the equation $$h = 0.240*t + (1061 + 0.444*t)*\frac{6.2198*RH*P_{ws}(t)}{14.721 + \frac{RH*P_{ws}(t)}{100}}$$

where:

$$P_{ws} = e^{\left[\frac{a1}{T}+a2+a3*T+a4*T^2+a5*T^3+a6*ln(T)\right]}$$

and T is temperature, RH is relative humidity a1–a6 are constants, and t is the temperature and;

adjusting a damper position to control the amount of external air with the calculated enthalpy being a parameter used to determine the damper position.

36. The method of claim 35, wherein the step of calculating further includes calculating an output of the form:

$$h = VR - \frac{C2}{C1}*\left(\frac{VX*RO}{(RO+RT)} - VR1\right) - \frac{CS}{C1}*\left(\frac{VX*RO}{RO+RT} - VR\right)$$

wherein VR is a first voltage, VR1 is a second voltage, VX is a third voltage, C1 is a first capacitance, C2 is a second capacitance, and R0 is a resistance in the electronic circuit.

37. The method of claim 35, wherein the step of calculating includes the further step of calculating an output of the form:

$$h = \frac{VR + \frac{C2}{C1}VR1 + CS\frac{VR}{C1}}{1+\left(\frac{CS+C2}{C1}\right)\left(\frac{FB*RO}{RO+RT}\right)}$$

wherein VR is a first voltage source, VR1 is a second voltage source, FB is a feedback gain, C1 is a first capacitance, C2 is a second capacitance, Cs is a third capacitance and R0 is a resistance in the electronic circuit.

38. The method of claim 35, wherein the step of calculating includes the step of calculating enthalpy with an error from actual enthalpy of no more than 4% over a range of temperature from 55 degrees to 105 degrees F and a range of humidities from 0% to 100%.

* * * * *

UNITED STATES PATENT AND TRADEMARK OFFICE
CERTIFICATE OF CORRECTION

PATENT NO. : 5,467,287
DATED : November 14, 1995
INVENTOR(S) : Ronald J. Wenner et al.

It is certified that error appears in the above-indentified patent and that said Letters Patent is hereby corrected as shown below:

Column 9, line 47, claim 1, after "source" insert --of--.

Column 9, line 56, claim 2, after "degrees" insert --F--.

Column 10, line 26, claim 5, in the second square root of the equation "B" should be --b--.

Column 10, line 37, claim 7, "c1,*RH+c2,*RH$^2$" should be --c1*RH+c2*RH$^2$--.

Column 10, line 41, claim 8, delete "and".

Column 10, line 61, claim 9, "group" should be --ground--.

Column 12, line 56, claim 15, in the second square root of the equation "B" should be --b--.

Column 13, line 36, claim 20, "(t)" should be --(T)--.

Column 13, line 55, claim 21, in the second square root of the equation "B" should be --b--.

Column 14, line 2, claim 23, "Cs" should be --CS--.

Column 14, line 5, claim 24, "calculator" should be --computing system--.

Column 14, line 5, claim 24, after "23" insert --,--.

Column 14, line 7, claim 24, "and" should be --,--.

UNITED STATES PATENT AND TRADEMARK OFFICE
CERTIFICATE OF CORRECTION

PATENT NO. : 5,467,287
DATED : November 14, 1995
INVENTOR(S) : Ronald J. Wenner et al.

It is certified that error appears in the above-indentified patent and that said Letters Patent is hereby corrected as shown below:

Column 14, line 11, claim 24, after "and" (first occurrence in patent) insert --,--.

Column 15, line 7, claim 28, "temperature" should be --temperatures--.

Column 15, line 8, claim 28, after "degrees" insert --F--.

Column 15, line 15, claim 29, in the second square root of the equation "B" should be --b--.

Column 15, line 26, claim 31, delete "and".

Column 16, line 53, claim 37, "Cs" should be --CS--.

Column 16, line 58, claim 38, "temperature" should be --temperatures--.

Signed and Sealed this

First Day of October, 1996

Attest:

BRUCE LEHMAN

Attesting Officer

Commissioner of Patents and Trademarks